United States Patent [19]

Nagai et al.

[11] Patent Number: 5,519,688
[45] Date of Patent: May 21, 1996

[54] SPINDLE MOTOR MOUNTING STRUCTURE AND DISK UNIT HAVING THE SAME

[75] Inventors: Michiaki Nagai, Koganei; Takahiro Sakaguchi, Kodaira; Kazuhiko Inoue, Houya, all of Japan

[73] Assignee: TEAC Corporation, Japan

[21] Appl. No.: 206,254

[22] Filed: Mar. 4, 1994

Related U.S. Application Data

[63] Continuation of Ser. No. 875,384, Apr. 29, 1992, abandoned.

[30] Foreign Application Priority Data

May 1, 1991 [JP] Japan .................. 3-030606 U

[51] Int. Cl.⁶ .................................. G11B 23/00
[52] U.S. Cl. ............................................. 369/270
[58] Field of Search .................... 369/270, 271, 369/264, 258, 176; 360/99.12

[56] References Cited

U.S. PATENT DOCUMENTS 4,599,663 7/1986 Saito et al. ................. 360/99.12
5,128,818 7/1992 Koizumi et al. ............. 360/99.12
5,177,733 1/1993 Kofke et al. ................. 369/258

FOREIGN PATENT DOCUMENTS 4-178960 6/1992 Japan ........................... 369/258

*Primary Examiner*—Stuart S. Levy
*Assistant Examiner*—Allen Cao
*Attorney, Agent, or Firm*—Andrus, Sceales, Starke & Sawall

[57] ABSTRACT

A spindle motor mounting structure for a disk or a disk cartridge recording/reproducing apparatus includes a substrate, a spindle motor including a stator part fixed on the substrate, a spindle shaft, and a disk shaped rotor part rotatably supported on the spindle shaft, and a frame on which the substrate is mounted. The rotor part has a flange part which extends from an outer periphery thereof, and the frame includes a projecting part which confronts at least a part of the flange to prevent the rotor part from slipping out of the spindle shaft. A height of an upper surface of the projecting part from the substrate is less than or equal to a height of an upper surface of the rotor part from the substrate.

6 Claims, 5 Drawing Sheets

SPINDLE MOTOR MOUNTING STRUCTURE AND DISK UNIT HAVING THE SAME

This application is a continuation application of U.S. patent application Ser. No. 07/875,384, filed 04/29/92 (now abandoned).

BACKGROUND OF THE INVENTION

The present invention generally relates to spindle motor mounting structures and disk units having the same, and more particularly to a spindle motor mounting structure which is suited for reducing the thickness of the structure and a disk unit which has such a spindle motor mounting structure.

FIG.1 shows a cross section of an example of a spindle motor part of a conventional disk unit. In FIG. 1, a spindle shaft 1 forms a rotor 4 of a spindle motor 12 together with a disk shaped rotor case 3 and magnets 2. The spindle shaft 1 is fit into the rotor case 3, and the magnets 2 are arranged on the lower surface of the rotor case 3. A stator 5 of the spindle motor 12 is formed by a bearing 7 which supports the spindle shaft 1, a support member 8 which rotatably supports the rotor 4 in an axial direction, and coils 9 which are located at positions confronting the magnets 2, and these elements of the stator 5 are provided on a substrate 6.

In this spindle motor 12 in which the rotor 4 is rotatably supported on the stator 5, the entire structure is provided on the substrate 6. In addition, the substrate 6 is fixed to a frame 11 which forms a main body of a disk unit 10 by screws 15 which is screwed in from the back surface of the substrate 6.

If a large external shock is applied to the spindle motor 12 having the above described construction, the spindle shaft 1 may slip out of the bearing 7. If this should happen, the rotor 4 will disengage from the stator 5. For this reason, in the conventional disk unit 10, a flange part 3a is provided on the outer periphery of the rotor case 3, and a washer 13 is fixed to the frame 11 so as to partially overlap the flange part 3a for an appropriate range in the plan view. The washer 13 is fixed to an upper surface of the frame 11 by screws 14 located at a plurality of positions. As a result, even if the rotor 4 should move upwardly in FIG. 1, that is, in a direction disengaging from the stator 5, the flange part 3a will hit the washer 13 and the washer 13 will prevent the rotor 4 from disengaging from the stator 5.

But according to the conventional disk unit 10, the washer 13 and the screws 14 are provided on the upper surface 11a of the frame 11 and therefore project upwardly from the upper surface 11a. If a height of this structure including the washer 13 and the screws 14 from the bottom of the substrate 6 is denoted by H1, a height position of a disk loading surface 3b on which a disk cartridge (not shown) is loaded must be set higher than the height H1. Otherwise, the disk cartridge will hit the screw 14 before reaching the disk loading surface 3b and the loading of the disk cartridge will become difficult. Therefore, in the conventional disk unit 10, the disk loading surface 3b must be set to a height greater than or equal to the height H1 of the head of the screw 14, and there is a problem in that the thickness of the spindle motor mounting structure and thus the thickness of the disk unit 10 cannot be further reduced.

SUMMARY OF THE INVENTION

Accordingly, it is a general object of the present invention to provide a novel and useful spindle motor mounting structure and a disk unit having such a spindle motor mounting structure, in which the problem described above is eliminated.

Another and more specific object of the present invention is to provide a spindle motor mounting structure comprising a substrate, a spindle motor including a stator part fixed on the substrate, a spindle shaft, and a disk shaped rotor part rotatably supported on the spindle shaft, and a frame on which the substrate is mounted, where the rotor part has a flange part which extends from an outer periphery thereof, the frame includes a projecting part which confronts at least a part of the flange to prevent the rotor part from slipping out of the spindle shaft, and a height of an upper surface of the projecting part from the substrate is less than or equal to a height of an upper surface of the rotor part from the substrate. According to the spindle motor mounting structure of the present invention, it is possible to positively prevent the rotor part from slipping out of the spindle shaft, and at the same time, it is possible to make the spindle motor mounting structure thinner than that of the conventional structure. In addition, if the projecting part is integrally formed on the frame, it is possible to reduce both the number of parts and the number of production processes.

Still another object of the present invention is to provide a disk unit which records and/or reproduces information signals on and/or from a disk or a disk cartridge which is loaded therein, comprising a substrate, a spindle motor including a stator part fixed on the substrate, a spindle shaft, and a disk shaped rotor part rotatably supported on the spindle shaft, and a frame on which the substrate is mounted, where the rotor part has a flange part which extends from an outer periphery thereof, the frame includes a projecting part which confronts at least a part of the flange to prevent the rotor part from slipping out of the spindle shaft, and a height of an upper surface of the projecting part from the substrate is less than or equal to a height of an upper surface of the rotor part from the substrate.

Other objects and further features of the present invention will be apparent from the following detailed description when read in conjunction with the accompanying drawings.

DESCRIPTION OF THE PREFERRED EMBODIMENTS

Figure 2:
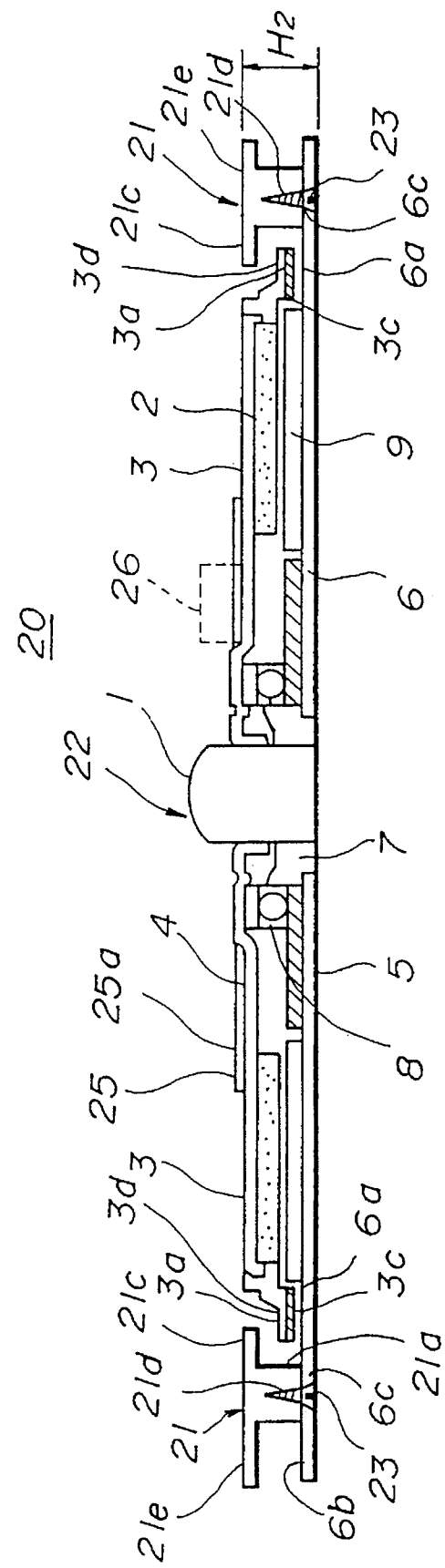
FIG. 2 is a cross sectional view showing an embodiment of a spindle motor mounting structure according to the present invention.
Figure 3:
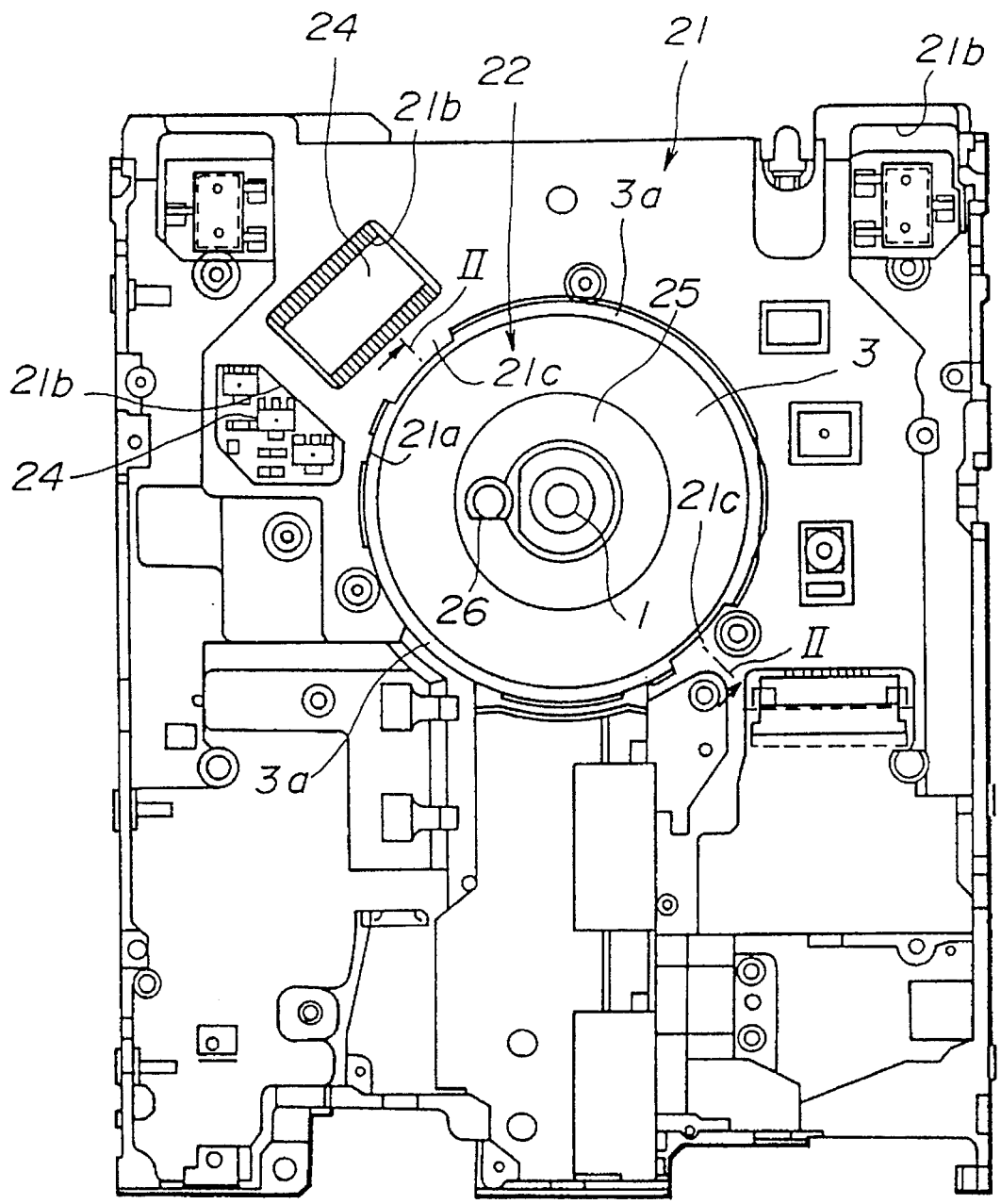
FIG. 3 is a plan view showing an embodiment of a disk unit according to the present invention employing the spindle motor mounting structure shown in FIG. 2.

FIG. 2 shows an embodiment of a spindle motor mounting structure according to the present invention, and FIG. 3 shows an embodiment of a disk unit according to the present invention employing the spindle motor mounting structure shown in FIG. 2. FIG. 2 is a cross section taken along a line II—II in FIG. 3.

Figure 1:
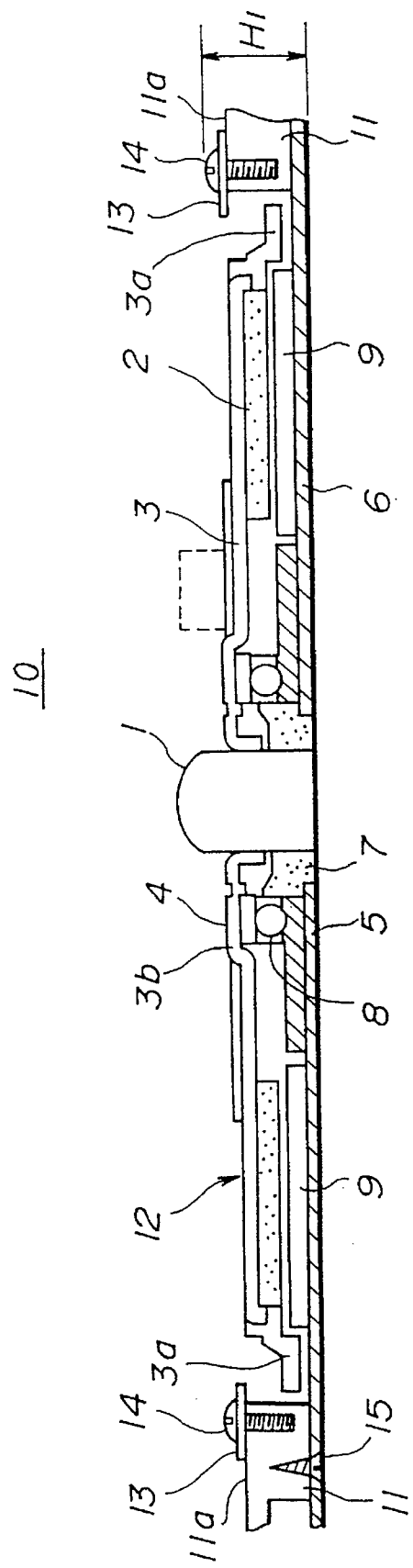
FIG. 1 is a cross sectional view showing an example of a spindle motor part of a conventional disk unit.

In FIG. 2, a spindle motor 22 has the same construction as the conventional spindle motor 12 described in conjunction with FIG. 1. In FIG. 2, those parts which are the same as those corresponding parts in FIG. 1 are designated by the same reference numerals, and a description thereof will be omitted. In this embodiment, a substrate 6 which is mounted with the spindle motor 22 is mounted on a frame 21 which forms a main body of the disk unit similarly to the conventional case.

First, a description will be given of the spindle motor 22.

In FIG. 2, a flange part 3a which extends to the outer peripheral side is provided on the outer periphery of a rotor case 3, similarly to the conventional case. Magnets 3c are provided on the lower part of the flange part 3a for the entire periphery of the flange part 3a. Conductor patterns 6a are provided on the substrate 6 at positions confronting the magnets 3c. When the rotor 4 rotates, the magnets 3c on the flange part 3a move above the conductor patterns 6a and a current is generated thereby. The rotational speed of the rotor 4 can be detected from the magnitude of this current. For these reasons, the flange part 3a is provided as close to the substrate 6 as possible.

In addition, as shown in FIGS. 2 and 3, a ring shaped chucking magnet 25 is provided on the upper surface of the rotor case 3 which is fixed to the spindle shaft 1, around the spindle shaft 1. This chucking magnet 25 is used to hold a metal hub of a loaded disk cartridge (not shown) onto the rotor case 3. Hence, the upper surface of the chucking magnet 25 becomes a disk loading surface 25a on which the disk cartridge or the disk is directly loaded. Furthermore, a positioning pin 26 which engages a positioning hole of the metal hub of the loaded disk cartridge is provided on the rotor case 3 at a position separated from the spindle shaft 1. This positioning pin 26 is indicated by a dotted line in FIG. 2.

Figure 4:
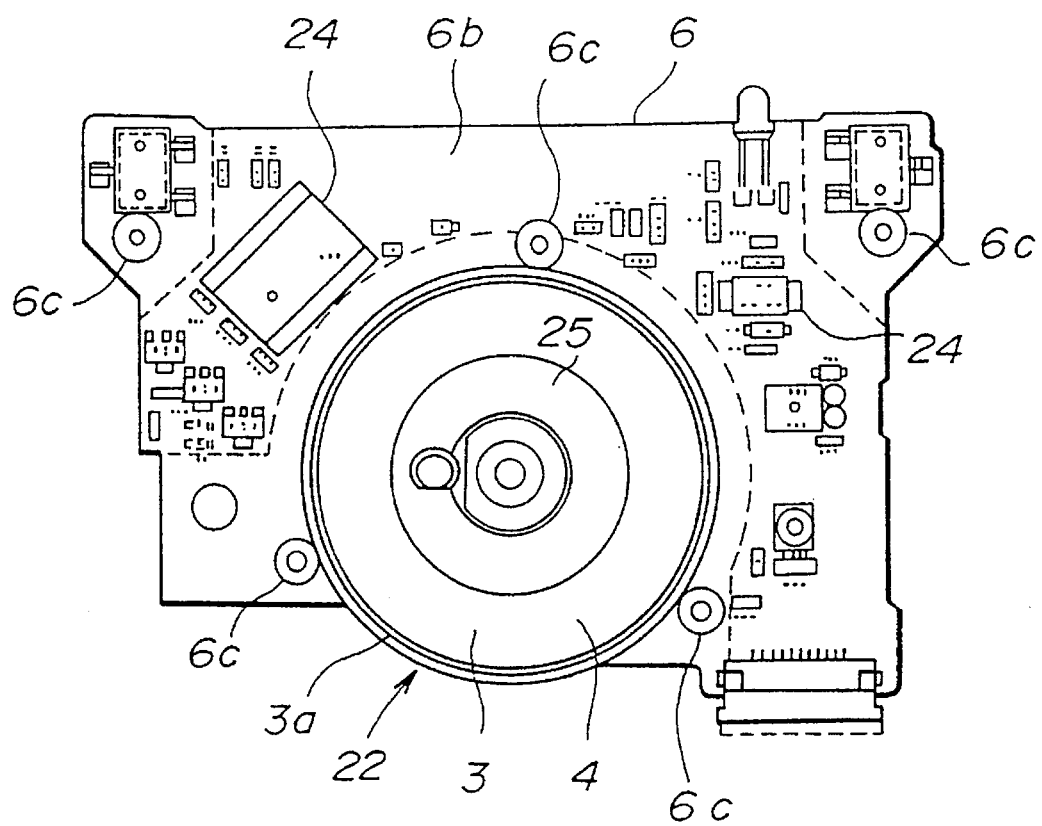
FIG. 4 is a plan view showing a substrate provided with a spindle motor.

FIG. 4 shows a plan view of the substrate 6 provided with the spindle motor 22. The substrate 6 is made of a thin metal plate, and an insulator layer is formed on the surface of the substrate 6. A resist layer is formed on the insulator layer of the substrate 6, and a conductor interconnection pattern is formed by a normal photolithography technique. As described above, a bearing of the spindle motor 22, a support member and coils are provided on an upper surface 6b of the substrate 6 to form a stator (not shown). The rotor 4 is rotatably provided on this stator to form the spindle motor 22.

Predetermined conductor patterns (not shown) are formed on the substrate 6 on the periphery of the spindle motor 22, and a plurality of electronic parts 24 are electrically connected and provided on the peripheral part of the substrate 6. The conductor patterns 6a formed on the substrate 6 at the positions confronting the flange part 3a of the rotor case 3 are formed similarly to the conductor interconnection patterns. Holes 6c for receiving screws for mounting the substrate 6 on a frame 21 are provided in the substrate 6. Three such holes 6c are provided on the periphery of the spindle motor 22, and two such holes 6c are provided on both ends parts of the substrate 6.

Figure 5:
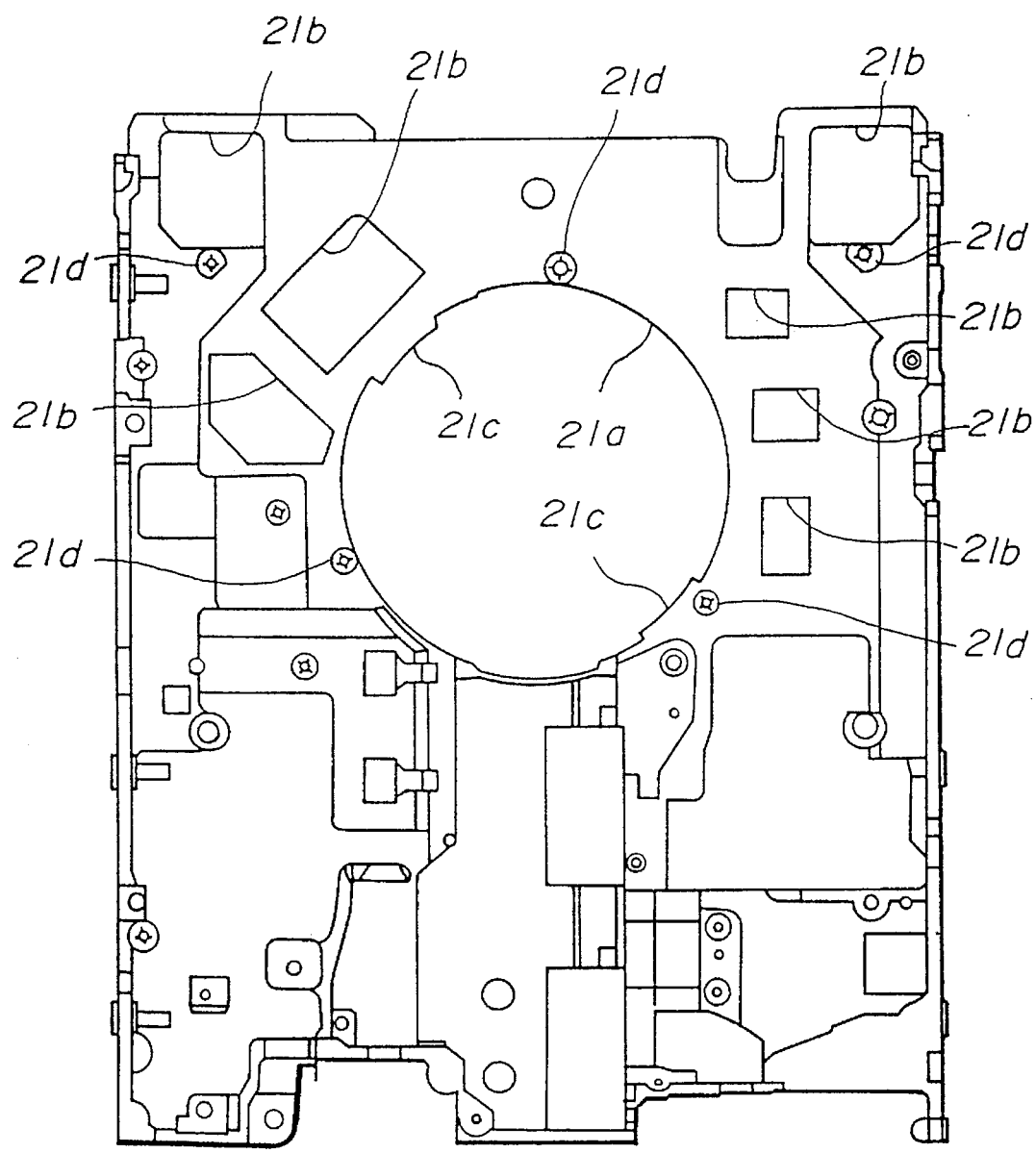
FIG. 5 is a plan view showing a frame by itself.

FIG. 5 shows a plan view of the frame 21 used in this embodiment. This frame 21 is integrally formed from die-cast aluminum, and includes an opening 21 for receiving the spindle motor 22, a plurality of openings 21 for exposing the various electronic parts and a plurality of mounting bases to which various parts are mounted. Two projecting parts 21c which project towards the center of the opening 21a are provided at confronting positions on the inner wall defining the opening 21a. The projecting parts 21c are provided at the same height position as an upper surface 21e of the frame, as shown in FIG. 2. In addition, threaded holes 21d are formed in the frame 21 at positions corresponding to the holes 6c of the substrate 6.

The substrate 6 which is mounted with the spindle motor 22 shown in FIG. 4 is mounted on the back side of the frame 21 shown in FIG. 5, by fitting the spindle motor 22 within the opening 21a and matching the holes 6c with the corresponding holes 21d. The substrate 6 is secured onto the frame 21 by screws 23 as shown in FIG. 2. In this state where the substrate 6 is mounted on the frame 21, the spindle motor 22 is exposed through the opening 21a as shown in FIG. 3 and the various electronic parts 24 are exposed through the respective openings 21b.

As described above, the projecting parts 21c of the frame 21 are provided at the same height position as the upper surface 21e of the frame 21. In addition, the flange part 3a of the rotor case 3 is provided very close to but is not in contact with the substrate 6. For this reason, in the state where the spindle motor 22 is fit within the opening 21a of the frame 21 as shown in FIGS. 2 and 3, the projecting parts 21c provided on the inner wall defining the opening 21a partially overlap the flange part 3a of the rotor case 3 in the plan view. Thus, even if the disk unit 20 receives a large shock and the rotor 4 moves in a direction slipping away from the stator 5, an upper surface 3d of the flange 3a will hit the projecting part 21c and restrict the upward movement of the rotor 4. As a result, it is possible to positively prevent the rotor 4 from slipping out of the stator 5 due to an external shock applied to the disk unit 20.

The projecting parts 21c are integrally formed on the frame 21 by die-cast aluminum as described above. Hence, the washer 13 and the screw 14 conventionally required to provide the projecting part as shown in FIG. 1 may be omitted in this embodiment. Consequently, the height H1 which was conventionally required is reduced to an original height H2 of the frame 21 as shown in FIG. 2, and the disk loading surface 25a can be set lower than that of the conventional case. As a result, the spindle motor mounting structure and the disk unit 20 using the same can be made thinner in this embodiment when compared to the conventional case.

In this embodiment, the projecting parts 21c are continuously formed on the frame 21 by simply modifying the shape of the die originally used to form the frame 21. Therefore, the troublesome operation of manually securing the washers 13 by the screws 14 for each disk unit is unnecessary in this embodiment. According to this embodiment, the number of parts and the number of production processes required to build the disk unit 20 can be considerably reduced compared to the conventional case, and the production cost of the disk unit 20 can also be reduced.

In the described embodiment, the projecting parts 21c are provided on the inner wall defining the opening 21a at mutually confronting positions. However, the number, shape, size and location of the projecting parts are not limited to those of the described embodiment. Effects substantially the same as those obtainable in the described embodiment are obtainable as long as the projecting parts are designed to prevent the rotor 4 from slipping out of the stator 5, that is, the projecting parts partially overlap the flange part 3a of the rotor case 3 in the plan view. Preferably, the projecting parts are integrally formed on the frame 21.

The projecting parts 21c of the described embodiment are integrally formed on the frame 21. However, the projecting parts 21c may be fixed on the frame 21 if the height H2 is guaranteed. In this case, the projecting parts 21c may be fixed on the frame 21 by screws, but it is also possible to fix the projecting parts 21c on the frame 21 by an adhesive agent or the like. The thickness of the disk unit 20 can be reduced effectively as long as the height H2 is guaranteed. In other words, it is desirable that the projecting parts 21c are integrally formed on the frame 21 when the number of parts and the number of production processes are taken into consideration, but the object of the present invention which is to reduce the thickness of the disk unit 20 can still be achieved if the height H2 of the upper surface 21e of the frame 21 is less than or equal to the height of the disk loading surface 25a.

Further, the present invention is not limited to these embodiments, but various variations and modifications may be made without departing from the scope of the present invention.

What is claimed is:

1. A spindle motor mounting structure for a disk or a disk cartridge recording/reproducing apparatus comprising:

a substrate;

a spindle motor including a stator part fixed on said substrate, a spindle shaft forming a central axis for said spindle motor mounting structure, a disk shaped rotor part supported on the spindle shaft to rotate with respect to said central axis; and a frame on which said substrate is mounted, said rotor part having a radially extending flange part which extends around an outer periphery thereof, said frame including an opening which receives the rotor part of said spindle motor, said opening being defined by annular, inner wall portions of the frame which surround said rotor part, said annular, inner wall portions being concentric to said central axis and spaced from the central axis by a first radial distance, said frame including a projecting part integrally formed therewith, said projecting part projecting toward said central axis intermediate said annular inner wall portions, said projecting part having an elongated, concave, arcuate shape with a length dimension extending in a circumferential direction about said central axis so that said projecting part occupies an arcuate sector intermediate said annular inner wall portions, said projecting part having a width dimension extending toward said central axis and having an exposed, concavely arcuately curved inner surface that is concentric to said central axis and said annular inner wall portions so that said concavely arcuately curved inner surface lies parallel to said annular inner wall portions, said concavely arcuately curved inner surface being located at a second radial distance from said central axis that is less than said first radial distance, said projecting part being spaced from said flange part of said rotor part in the axial direction of said central axis, at least a portion of said projecting part confronting an upper surface of the flange part of the rotor part to retain said rotor part on said spindle shaft, a height of an upper surface of the projecting part from said substrate in the axial direction of the central axis being less than or equal to a height of an upper surface of the rotor part from said substrate.

2. The spindle motor mounting structure as claimed in claim 1, wherein the upper surface of the rotor part is a surface on which the disk or the disk cartridge is loaded.

3. The spindle motor mounting structure as claimed in claim 1, wherein a plurality of said projecting parts are integrally formed at a plurality angularly spaced positions on said annular inner wall portion of the frame.

4. A disk unit which records and/or reproduces information signals on/or from a disk or a disk cartridge which is loaded herein, said disk unit comprising:

a substrate;

a spindle motor including a stator part fixed on said substrate, a spindle shaft forming a central axis, a disk shaped rotor part supported on the spindle shaft to rotate with respect to said central axis; and a frame on which said substrate is mounted, said rotor part having a radially extending flange part which extends around an outer periphery thereof, said frame including an opening which receives the rotor part of said spindle motor, said opening being defined by annular, inner wall portions of the frame which surround said rotor part, said annular, inner wall portions being concentric to said central axis and spaced from the central axis by a first radial distance, said frame including a projecting part integrally formed therewith, said projecting part projecting toward said central axis intermediate said annular inner wall portions, said projecting part having an elongated, concave, arcuate shape with a length dimension extending in a circumferential direction about said central axis so that said projecting part occupies an arcuate sector intermediate said annular inner wall portions, said projecting part having a width dimension extending toward said central axis and having an exposed, concavely arcuately curved inner surface that is concentric with said central axis and said annular inner wall portions so that said concavely arcuately curved inner surface lies parallel to said annular inner wall portions, said concavely arcuately curved inner surface being located at a second radial distance from said central axis that is less than said first radial distance, said projecting part being spaced from said flange part of said rotor part in the axial direction of said central axis, at least a portion of said projecting part confronting an upper surface of the flange part of the rotor part to retain said rotor part on said spindle shaft, a height of an upper surface of the projecting part from said substrate in the axial direction of the central axis being less than or equal to a height of an upper surface of the rotor part from said substrate.

5. The disk unit as claimed in claim 4, wherein the upper surface of the rotor part is a surface on which the disk or the disk cartridge is loaded.

6. The disk unit as claimed in claim 4, wherein a plurality said projecting parts are integrally formed at a plurality angularly spaced positions on said annular inner wall portion of the frame.

* * * * *